Feb. 13, 1940. J. W. FRENCH 2,190,541
RANGE FINDER AND LIKE OPTICAL MEASURING INSTRUMENT
Filed Jan. 10, 1938

INVENTOR
James Weir French
BY
E. H. Bond
ATTORNEY

Patented Feb. 13, 1940

2,190,541

UNITED STATES PATENT OFFICE 2,190,541

RANGE FINDER AND LIKE OPTICAL MEASURING INSTRUMENT

James Weir French, Anniesland, Glasgow, Scotland, assignor to Barr and Stroud, Limited, Glasgow, Scotland Application January 10, 1938, Serial No. 184,280
In Great Britain January 14, 1937

16 Claims. (Cl. 88—2.7)

This invention refers to range finders and like optical measuring instruments (hereinafter referred to generally as range finders), operating on either the coincidence or the stereoscopic principle.

The invention is concerned with range finders of the class in which measurement of range is effected by angular movement of a prism or prisms, each in its own plane, about the axis of the beam of light in which the prism is placed, in which connection it may be explained that range finders are well known, both of the coincidence and stereoscopic type, in which measurement of range is effected by means of a pair of prisms placed near to one another in one of the beams of light, these prisms being simultaneously rotated about the axis of that beam in opposite directions, and that range finders are also known in which each of two beams of light has in its path one and only one prism movable angularly about the axis of that beam. Range finders with which the invention is concerned will hereinafter be referred to as of the angularly movable measuring prism type.

It has been the practice in range finders of the angularly movable measuring prism type for the movement angularly to give ranges extending from a minimum, say 1000 yards, up to the maximum finite range for which the instrument is designed, say 10,000 yards, and beyond that to infinite range for purposes of adjustment of the instrument. The angular movement corresponding with a given step of range, say 10 yards, is not the same throughout, as will be hereinafter more fully explained, but decreases as range increases until at high ranges it may be very small. It is not, however, desirable that the angular movement per step of range at high ranges should be very small relative to that at low ranges, and the principal object of this invention is to provide an optical system which in this respect is improved as compared with present practice.

According to this invention a range finder is provided in which the angular movement of the measuring prism or prisms is arranged to correspond with range measurement varying from a minimum to the maximum finite range which the instrument is designed to determine, thus, excluding ranges extending above that maximum to infinity, and supplementary movable optical means, which are normally stationary, are provided which can be brought into operation for obtaining settings above the said maximum.

In carrying the invention into practice the supplementary optical means may comprise two separately movable optical parts such that movement of one of these parts effects settings above the maximum finite range obtainable by the measuring prism (or prisms) up to infinity, while movement of the other supplementary part serves to effect adjustment setting at infinity.

In one example, there is provided in each of two beams a supplementary deviating prism movable angularly about the optical axis of its beam, one of the supplementary prisms being movable from a lower limiting position corresponding with the maximum finite range into an upper limiting position corresponding with infinity, while the second supplementary prism is separately movable for adjustment setting at infinity, adjustment of the instrument being effected by moving the measuring prism (or prisms) into its upper limiting position, then moving the first supplementary prism from its lower limiting to its infinity position, and then, for adjustment setting, moving the second supplementary prism, the first supplementary prism being returned to its lower limiting position before the instrument is used for range measurement.

Some examples of range finders in accordance with the invention will now be described with reference to the accompanying drawing, in which—

Figure 1:
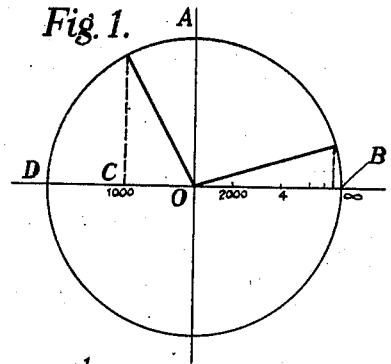
Figures 1 and 2 are explanatory diagrams, Figure 1 representing the prior art and Figure 2 the present invention.

The diagram, Figure 1, illustrates the relationship between angular movement and scale readings in the case of an instrument in which the angular movement includes infinity setting, the angular movement being between the limits OA and OB, and the scale, a reciprocal scale, corresponding with the distance CB along the diameter DB. The scale readings become crowded together at high ranges compared with at low ranges and the angular movement corresponding with a step of range decreases rapidly at the upper end of the scale. From the point of view of obtaining as small a variation as possible in the angular movement corresponding with a step of range, the optimum position for the low range is between O and D, somewhat as shown, because, if the low range position is displaced further towards D, the angular movement corresponding with a step at low range becomes unduly large.

Under the conditions shown, the ratio of the angular movement per step of range at low ranges to the angular movement per step at high ranges, say 9000 yards, is large.

Figure 2:
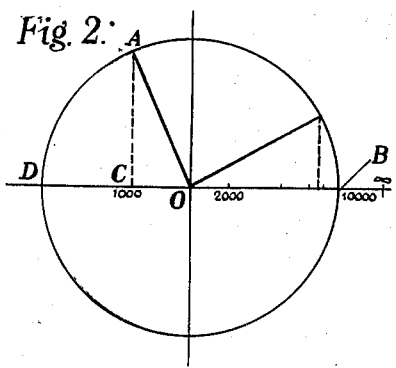

Figure 2 illustrates the present invention, the low range being at the optimum position between O and D but the maximum finite range position, say 10,000 yards, being at B, ranges above 10,000 yards up to infinity being beyond B, that is, not within the scope of the angular movement of the measuring prism. It will be seen that a much larger angular movement per step of range at, say, 9,000 yards will be required than in Figure 1 and the difference between the angular movement at low ranges and at high ranges is considerably less.

Figure 3:
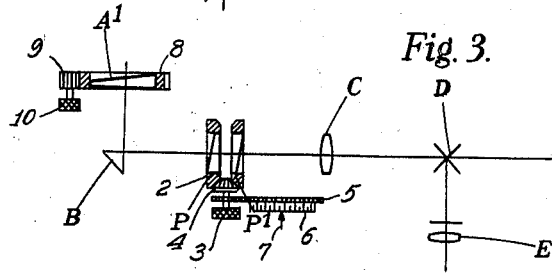
Figure 3 shows diagrammatically one example of optical system.
Figure 4:
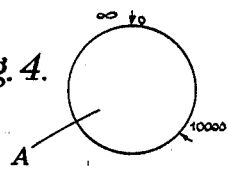
Figure 4 shows a detail thereof.

Referring now to Figure 3, which shows the optical system of a coincidence range finder, light from an object under observation enters the instrument at each end of the base through a window A or A$^1$, is directed towards the middle of the base by a reflecting prism B, passes through an objective C and is reflected at right angles to the base towards the eye of the observer by a reflector D, an eyepiece being denoted by E. In the left hand beam there is provided a pair of measuring prisms P, P$^1$ movable angularly simultaneously in opposite senses, their angular movement being adapted to effect range measurement from, say, 1000 yards up 10,000 yards, but not beyond that. Each of the windows A, A$^1$ is in the form of a deviating prism and is rotatable in its own plane about the optical axis at the window. The window A is movable, see Figure 4, between two limits, a lower limit corresponding with 10,000 yards and an upper limit corresponding with infinity, while the window A$^1$ is adjustable angularly about an infinity position. For infinity setting of the instrument, the measuring prisms P, P$^1$ are first turned to the upper limit of their movement, viz., 10,000 yards, then the window A is turned from its normal position corresponding with 10,000 yards into its upper limiting position corresponding with infinity, and then, if adjustment is required, it is effected by turning the window A$^1$ in one direction or the other. Before using the instrument for the measurement of ranges in the ordinary way, the window A is returned to its normal position, the window A$^1$ being left in its adjusted position.

Bevel gear mechanism 2 is shown for turning the prisms P, P$^1$, motion being applied by the observer to an operating head 3. A pinion wheel 4 turning with the head 3 engages with a pinion wheel 5 which carries a scale drum 6 co-operating with a fixed mark 7 to indicate the range setting of the instrument, the scale being graduated from 1000 yards to 10,000 yards. Each of the windows A, A$^1$ is carried in a ring 8, which is rotatably mounted in the casing of the instrument and is turned by means of a pinion wheel 9 and head 10, the window A being movable between two stops corresponding with the 10,000 yards position and the infinity position, and the window A$^1$ being capable of sufficient movement to cover any adjustment at infinity which will be necessary. As the movements of the windows A, A$^1$ correspond with settings of the instrument above the maximum finite range where range readings are not required, no scale is required in connection with their movements, the scale drum 6 being the only scale provided for range measurement.

Figure 5:
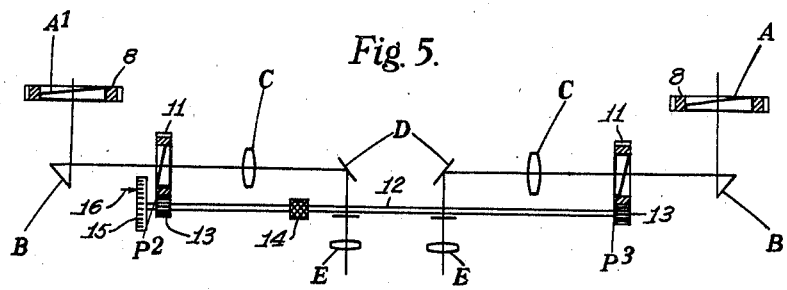
Figures 5 and 6 show a second and a third example of optical system, respectively.

Figure 5 shows an ortho-stereoscopic range finder system, the light entering the instrument through the windows A or A$^1$ at the ends of the base being directed towards the middle of the base by reflecting prisms B, through objectives C and being reflected towards the observer by reflectors D, there being in this case two eyepieces E. In each of the beams there is a measuring prism P$^2$ or P$^3$, the prisms being connected together so as in the operation of the instrument to be rotatable in the same direction and to the same extent, as described in the specification of my co-pending application Serial No. 182,613 filed December 30, 1937. The angular movement of the prisms P$^2$ and P$^3$ gives ranges from a minimum, say 1000 yards, up to the maximum finite range, say 10,000 yards, while ranges above 10,000 yards up to infinity and also infinity adjustment are dealt with by the windows A and A$^1$ as in Figure 3.

Each of the prisms P$^2$, P$^3$ is mounted in a rotatable carrier ring 11 having a toothed periphery. A rod 12 extends longitudinally and has two pinion wheels 13, one for engagement with each of the toothed carriers 11. The rod 12 also carries an operating head 14 by which the observer can turn the two prisms P$^2$, P$^3$. At the left hand end of the rod 12 there is a scale drum 15 which turns with the rod 12 and co-operates with a fixed mark 16. The windows A, A$^1$ are mounted and operated in the same way as described with reference to Figure 3.

Figure 6:
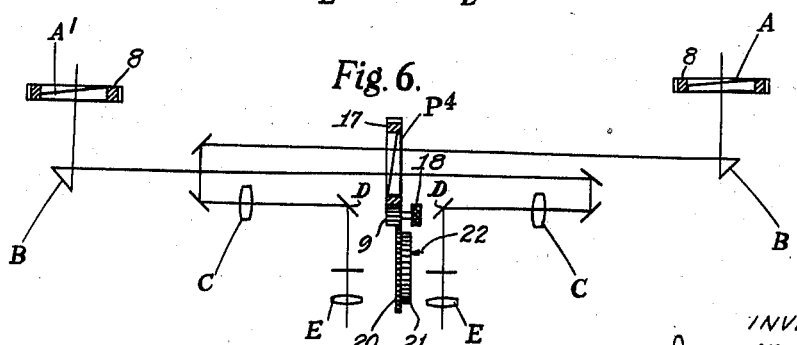

The optical system shown in Figure 6 is pseudo-stereoscopic for use with reference marks provided within the instrument. In this case a single angularly movable measuring prism P$^4$ is employed, being situated so that both of the beams pass through it, this being a construction described and claimed in the specification of co-pending application Serial No. 182,613, filed December 30, 1937, by the present applicant. Angular movement of the prism P$^4$ corresponds with ranges varying from, say, 1000 yards to 10,000 yards, while the windows A and A$^1$ are provided to function as has already been described with reference to Figures 3, 4 and 5.

The prism P$^4$ is mounted in a toothed carrier ring 17 to which rotational movement is imparted from a head 18 through the medium of a pinion wheel 19. The pinion wheel 19 meshes with a pinion wheel 20 which carries a scale drum 21 co-operating with a fixed mark 22.

I claim:

1. A range finder comprising measuring prism means arranged permanently and angularly movably in the path of the light within the instrument, means for moving said prism means for effecting measurement of range, the extent of movement arranged for corresponding with range readings from a minimum to the maximum finite range which the instrument is to determine, and supplementary movable light deviating means permanently in the path of the light, and normally stationary in the operation of range finding, means for moving said supplementary light deviating means independently of the measuring prism means, to effect settings of the instrument above said maximum finite range, and one and the same graduated scale serving for all range readings obtainable with the instrument.

2. A range finder comprising measuring prism means arranged permanently and angularly movably in the path of the light within the instrument, means for moving said prism means for effecting measurement of range, the extent of movement arranged for corresponding with range readings from a minimum to the maximum finite range which the instrument is to determine, and supplementary movable light deviating means permanently in the path of the light, and normally stationary in the operation of range finding and including two separately movable optical parts, means for moving these parts separately and independently of the measuring prism means, movement of one of the parts effecting settings above the maximum finite range up to infinity and movement of the other part effecting adjustment setting of the instrument at infinity and one and the same graduated scale serving for all range readings obtainable with the instrument.

3. A range finder comprising measuring prism means arranged permanently and angularly movably in the path of the light within the instrument, means for moving said prism means for effecting measurement of range, the extent of movement arranged for corresponding with range readings from a minimum to the maximum finite range which the instrument is to determine, two supplementary deviating prisms, normally stationary in the operation of range finding, one permanently arranged in each of the two measuring beams of the range finder and each angularly movable separately about the optical axis of its beam and independently of the measuring prism means, means for moving said supplementary prisms, one of the supplementary prisms being movable from a lower limiting position corresponding with the maximum finite range into an upper limiting position corresponding with infinity and the second supplementary prism being movable for adjustment setting at infinity, and one and the same graduated scale serving for all range readings obtainable with the instrument.

4. A range finder comprising an instrument casing, measuring prism means permanently arranged and angularly movable in the path of the light within the instrument, means for moving said prism means for effecting measurement of range, the extent of movement arranged for corresponding with range readings from a minimum to the maximum finite range which the instrument is to determine, two windows, one at each end of the instrument base, for the reception of light, each of said windows constituting a supplementary deviating prism permanently arranged in and movable angularly about the axis of its light beam, means for separately moving said windows, one of the windows being movable from a lower limiting position corresponding with the maximum finite range into an upper limiting position corresponding with infinity and the other window being movable for adjustment setting at infinity, and one and the same graduated scale serving for all range readings obtainable with the instrument.

5. A range finder comprising a pair of adjacently disposed measuring prisms permanently arranged in the path of one of the image-forming beams of the instrument and angularly movable about the axis of that beam, means for moving said prisms simultaneously in opposite senses about the axis of that beam for effecting measurement of range, the extent of movement arranged for corresponding with range readings from a minimum to the maximum finite range which the instrument is to determine, supplementary movable light deviating means, permanently in the path of the light and normally stationary in the operation of range finding, means for moving said supplementary light deviating means independently of the measuring prisms, to effect settings of the instrument above the said maximum finite range, and one and the same graduated scale serving for all range readings obtainable with the instrument.

6. A range finder comprising a pair of adjacently disposed measuring prisms permanently arranged in the path of one of the image-forming beams of the instrument and angularly movable about the axis of that beam, means for moving said prisms simultaneously in opposite senses about the axis of that beam for effecting measurement of range, the extent of movement arranged for corresponding with range readings from a minimum to the maximum finite range which the instrument is to determine, supplementary movable light deviating means permanently in the path of the light, and normally stationary in the operation of range finding and including two separately movable optical parts, means for moving said parts separately and independently of the measuring prisms, movement of one of the parts effecting settings above the maximum finite range up to infinity and movement of the other part effecting adjustment setting at infinity, and one and the same graduated scale serving for all range readings obtainable with the instrument.

7. A range finder comprising a pair of adjacently disposed measuring prisms permanently arranged in the path of one of the image-forming beams of the instrument and angularly movable about the axis of that beam, means for moving said prisms simultaneously in opposite senses about the axis of that beam for effecting measurement of range, the extent of movement arranged for corresponding with range readings from a minimum to the maximum finite range which the instrument is to determine, two supplementary deviating prisms, normally stationary in the operation of range finding, permanently disposed one in each of the two measuring beams of the range finder and each angularly movable separately about the optical axis of its beam, means for moving said supplementary prisms separately and independently of the measuring prisms, one of the supplementary prisms being movable from a lower limiting position corresponding with the maximum finite range into an upper limiting position corresponding with infinity and the second supplementary prism being movable for adjustment setting at infinity, and one and the same graduated scale serving for all range readings obtainable with the instrument.

8. A range finder comprising an instrument casing, a pair of adjacently disposed measuring prisms permanently arranged in the path of one of the image-forming beams of the instrument and angularly movable about the axis of that beam, means for moving said prisms simultaneously in opposite senses about the axis of that beam for effecting measurement of range, the extent of movement arranged for corresponding with range readings from a minimum to the maximum finite range which the instrument is to determine, two windows, one at each end of the instrument base, for the reception of light, each of said windows constituting a supplementary deviating prism movable angularly about the axis of its beam, means for separately moving said windows independently of the measuring prisms, one of the windows being movable from a lower limiting position corresponding with the maximum finite range into an upper limiting position corresponding with infinity and the other window being movable for adjustment setting at infinity, and one and the same graduated scale serving for all range readings obtainable with the instrument.

9. A stereoscopic range finder in which each of two image-forming beams of light has permanently arranged in its path one (and only one) angularly movable prism, and comprising prism moving means for effecting measurement of range by prism movement, the extent of movement arranged for corresponding with range readings from a minimum to the maximum finite range which the instrument is to determine, and supplementary light deviating means permanently in the path of the light, and normally stationary in the operation of range finding, means for moving said supplementary light deviating means to effect settings of the instrument above said maximum finite range, and one and the same graduated scale serving for all range readings obtainable with the instrument.

10. A stereoscopic range finder in which each of two image-forming beams of light has permanently arranged in its path one (and only one) angularly movable measuring prism, and comprising prism moving means for effecting measurement of range by prism movement, the extent of movement arranged for corresponding with range readings from a minimum to the maximum finite range which the instrument is to determine, supplementary light deviating means permanently in the path of the light, and normally stationary in the operation of range finding and including two separately movable optical parts, means for moving these parts separately, movement of one of the parts effecting settings above the maximum finite range up to infinity and movement of the other part effecting adjustment setting of the instrument at infinity, and one and the same graduated scale serving for all range readings obtainable with the instrument.

11. A stereoscopic range finder in which each of two image-forming beams of light has permanently arranged in its path one (and only one) angularly movable measuring prism, and comprising prism moving means for effecting measurement of range by prism movement, the extent of movement arranged for corresponding with range readings from a minimum to the maximum finite range which the instrument is to determine, two supplementary deviating prisms permanently arranged, one in each of said two light beams and each movable angularly separately about the optical axis of its beam, means for moving said supplementary deviating prisms separately, one of the supplementary prisms being movable from a lower limiting position corresponding with the maximum finite range into an upper limiting position corresponding with infinity and the second supplementary prism being movable for adjustment setting at infinity, and one and the same graduated scale serving for all range readings obtainable with the instrument.

12. A stereoscopic range finder in which each of two image-forming beams of light has permanently arranged in its path one (and only one) angularly movable measuring prism, and comprising prism moving means for effecting measurement of range by prism movement, the extent of movement arranged for corresponding with range readings from a minimum to the maximum finite range which the instrument is to determine, an instrument casing enclosing the optical system, and two windows, one at each end of the instrument base, for the reception of light, each of said windows constituting a supplementary deviating prism movable angularly about the axis of its beam, and means for separately moving said windows, one of the windows being movable from a lower limiting position corresponding with the maximum finite range into an upper limiting position corresponding with infinity and the other window being movable for adjustment setting at infinity, and one and the same graduated scale serving for all range readings obtainable with the instrument.

13. A range finder having an ortho-stereoscopic optical system and comprising two measuring prisms permanently arranged, one (and only one) in the path of each of its two image-forming beams of light and angularly movable about the axis of the beam, means for simultaneously moving the said prisms in the same sense for effecting measurement of range, the extent of movement arranged for corresponding with range readings from a minimum to the maximum finite range which the instrument is to determine, supplementary movable light deviating means permanently arranged in the path of the light, and normally stationary in the operation of range finding, means for moving said supplementary light deviating means independently of the measuring prisms, to effect settings of the instrument above said maximum finite range, and one and the same graduated scale serving for all range readings obtainable with the instrument.

14. A range finder having an ortho-stereoscopic optical system and comprising two measuring prisms permanently arranged, one (and only one) in the path of each of its two image-forming beams of light and angularly movable about the axis of the beam, means for simultaneously moving the said prisms in the same sense for effecting measurement of range, the extent of movement arranged for corresponding with range readings from a minimum to the maximum finite range which the instrument is to determine, two supplementary deviating prisms permanently arranged, one in each of said beams, each movable angularly about the axis of its beam, means for moving said supplementary prisms separately and independently of the measuring prisms, one of the supplementary prisms being movable from a lower limiting position corresponding with the maximum finite range into an upper limiting position corresponding with infinity and the second supplementary prism being movable for adjustment setting at infinity, and one and the same graduated scale serving for all range readings obtainable with the instrument.

15. A range finder having a pseudo-stereoscopic optical system and having one and the same angularly movable measuring prism permanently arranged to serve in its two beams of light, said prism being placed in the paths of the two beams at a position where the beams proceed side by side, means for moving said measuring prism angularly in the two beams for effecting measurement of range, the extent of movement arranged for corresponding with range readings from a minimum to the maximum finite range which the instrument is to determine, supplementary light deviating means in the path of the light, normally stationary in the operation of range finding, means for moving said supplementary light deviating means independently of the measuring prism to effect settings of the instrument above said maximum finite range, and one and the same graduated scale serving for all range readings obtainable with the instrument.

16. A range finder having a pseudo-stereoscopic optical system and having one and the same angularly movable measuring prism permanently arranged to serve its two beams of light, said prism being placed in the paths of the two beams at a position where the beams proceed side by side, means for moving said measuring prism angularly in the two beams for effecting measurement of range, the extent of measurement arranged for corresponding with range readings from a minimum to the maximum finite range which the instrument is to determine, two supplementary deviating prisms, permanently arranged one in each of said beams, each movable angularly about the axis of its beam, and means for moving said supplementary prisms separately and independently of the measuring prism, one of the supplementary prisms being movable from a lower limiting position corresponding with the maximum finite range into an upper limiting position corresponding with infinity and the second supplementary prism being movable for adjustment setting at infinity, and one and the same graduated scale serving for all range readings obtainable with the instrument.

JAMES WEIR FRENCH.